United States Patent [19]

Yano et al.

[11] 4,234,619
[45] Nov. 18, 1980

[54] DECHOLESTEROLIZED AND DEFATTED EGG POWDER AND METHOD FOR PRODUCING SAME

[75] Inventors: Nobumitsu Yano; Itaru Fukinbara, both of Tokyo; Koji Yoshida; Yutaka Wakiyama, both of Kamikohashi, all of Japan

[73] Assignee: Asahi Kasei Kogyo Kabushiki Kaisha, Osaka, Japan

[21] Appl. No.: 957,594

[22] Filed: Nov. 3, 1978

[30] Foreign Application Priority Data

Nov. 16, 1977 [JP] Japan .................. 52/136678

[51] Int. Cl.$^3$ ............... A23L 1/28; A23L 1/32
[52] U.S. Cl. .................. 426/614; 426/385; 426/429; 426/471; 426/472; 426/480; 426/490
[58] Field of Search ............ 426/327, 330.1, 614, 426/384, 385, 429, 444, 471, 472, 478, 490, 800, 312, 422, 424, 492, 480

[56] References Cited

U.S. PATENT DOCUMENTS

| | | | |
|---|---|---|---|
| 2,950,204 | 8/1960 | Peebles | 426/614 X |
| 3,162,540 | 12/1964 | Kline et al. | 426/614 X |
| 3,563,765 | 2/1971 | Melnick | 426/614 |
| 3,795,750 | 3/1974 | Levine | 426/429 X |
| 3,958,034 | 5/1976 | Nath et al. | 426/614 |
| 4,069,351 | 1/1978 | Yano et al. | 426/429 X |

FOREIGN PATENT DOCUMENTS 12692  4/1976  Japan .

OTHER PUBLICATIONS

Van Arsdel et al., *Food Dehydration*, 2nd ed., vol. 2, 1973, pp. 366-369, Gp. 170.

*Primary Examiner*—Arthur L. Corbin
*Attorney, Agent, or Firm*—Sprung, Felfe, Horn, Lynch & Kramer

[57] ABSTRACT

Decholesterolized and defatted egg powder is obtained by removing at least 95% of the cholesterol and neutral fat and retaining 30% or more of the phospholipids, based on the content thereof in the whole egg or yolk. Said powder is obtained by removing moisture from whole egg or yolk and extracting cholesterol and neutral fat from the dried whole egg or yolk with liquid dimethylether.

4 Claims, No Drawings

DECHOLESTEROLIZED AND DEFATTED EGG POWDER AND METHOD FOR PRODUCING SAME

FIELD OF THE INVENTION

The present invention relates to decholesterolized, defatted egg powder, which is obtained by removing all or nearly all of the cholesterol and neutral fats contained in whole eggs or in yolks by extraction while retaining a part of the phospholipids, and which is free of any remaining solvent, and a method for its production.

BACKGROUND OF THE INVENTION

It is an object of the present invention to provide decholesterolized, defatted egg powder having a lower cholesterol content and fewer calories, and yet having good flavor and physical properties comparable to those of raw whole egg, and which is safe for use as a food because of the absence of any remaining solvent.

Eggs, particularly hens' eggs, are eaten in the form of fried eggs, boiled eggs or scrambled eggs, and they are used frequently as materials for processing various cakes or foods such as raw cream, mayonnaise, cake raw materials, etc. It is well known that they are high calorie protein-aceous food having such a mix of amino acids beneficial to man that they are one of the basic protein foods.

It is also well known that hens' egg yolks are high in cholesterol (1600 mg cholesterol/100 g yolk). Cholesterol is a compound having an aromatic polycyclic structure and a hydroxyl group. It is biosynthesized in bodies of animals and also taken into the bodies from foods. Many versatile and important functions of cholesterol have been recognized, such as digestion of lipids, involvement in in vivo transport or metabolism of lipids in general, and a wetting effect on the skin in cooperation with phospholipids.

As the result of recent improvements as well as westernization of the diet, egg consumption in Japan is rapidly growing. In western countries which are large egg consumers, an increase of cholesterol concentration in human blood due to a large cholesterol intake in food has already caused problems.

It is now generally accepted in the field of medicine, notwithstanding its important functions, that when the concentration of cholesterol in the blood increases, it deposits gradually on the inner walls of blood vessels or encroaches into the walls of blood vessels in a form combined with lipoproteins in the blood and becomes a major cause of arteriosclerosis, a disease of the aged, and as a consequence leads to hypertension and cardiac diseases.

Under such circumstances it is common in the United States for individuals to limit their consumption to five eggs a week.

In response thereto several kinds of low fat decholesterolized, defatted egg products have appeared in the market. They are classified into two major groups. One of them is a pseudo-defatted egg in which the yolk has been removed from the beginning. As the name indicates they are egg imitations in which egg white or the like is used as a major protein material, and various ingredients are admixed in order to make their composition and flavor close to those of real eggs. Although these egg imitations actually do not contain cholesterol, and they are indeed low calorie foods, their flavor, their nutritive values and their physical properties are of quality considerably different from raw whole eggs because yolks are not used, and hence they have not been accepted by consumers nutriologically and psychologically.

The other group uses whole egg as a raw material and is produced by a solvent extraction method to remove cholesterol and total lipids.

These products have been subjected to defatting and decholesterolization with a hydrophilic solvent for extracting oil and fat, such as chloroform-methanol or ethanolacetone-ethyl ether. Thus there is obtained defatted whole egg having an almost white color and containing hardly any cholesterol, oils, or fats.

Although these ought to have produced defatted whole eggs having high nutritive value because their raw material is raw whole eggs, such products are still imperfect and have not yet enjoyed popularity because their proteins have been denatured and there is considerable loss in flavor, taste and performance when used as eggs, as compared with raw whole eggs.

The following conclusions have been reached as to the causes therefor:

First of all, what is considered to be the cause is the use of a non-polar-polar solvent mixture for extraction of cholesterol and oils and fats. Although a non-polar solvent is indispensable for extraction of oils and fats, it was believed that thorough extraction of oils and fats from eggs or the like containing a large amount of water could not be achieved with a non-polar solvent alone because of its hydrophobic nature. Accordingly, an alcoholic type hydrophilic polar solvent is usually admixed to break, for example, hydrophobic bonds and electrostatic bonds between protein and phospholipids, such as those which are connected to membranes of living bodies and are relatively difficult to extract. By such solvents, cholesterol and total fats are completely removed and thus the crude fat content is reduced to about 0.1 percent, and phospholipids are almost totally absent from the residue of extraction.

That is to say, because of complete defatting, proteins in the defatted whole egg obtained by this method are denatured to a considerable extent. Furthermore, phospholipds themselves are absent. Hence, marked degradations are noticeable even after defatted proteins are thoroughly rehydrated, not only in the reduction in solubility, but also in various properties such as foaming and oil-retention as well as emulsifying.

The second cause is a problem of treatment after extraction. Heat treatments, such as that involved in removing the extraction solvent, result in denaturing of the protein which promotes degradation and loss of protein.

Solvents usually used for defatting, such as hexane or the like, must be completely removed from proteins after extraction. Thus, a process is carried out in which residual proteins are contacted with steam to drive off the remaining hexane, but heating carried out at a temperature of 100° C. or higher for a long period of time, however, utterly changes the macro-structure of proteins to such an extent that the change is clearly observable even with the naked eye, making rehydration of the defatted proteins very difficult.

In order to overcome the above-mentioned two drawbacks, a new solvent extraction method has recently been developed. This improved method is directed only to yolk. Namely it comprises conducting cholesterol removal and partial defatting of yolk solid matter only with a non-polar solvent such as hexane, heptane, cyclohexane and the like. Since denaturing of egg proteins was so extensive in prior methods, attention was paid to the removal of moisture in the raw material, and the whole process was carried out at a relatively low temperature to control denaturing of proteins.

Although this method succeeded in maintaining egg properties to a certain extent, the solvent was not thoroughly removed because of the lower temperatures employed in the solvent removal step to prevent protein denaturation. Thus there are available only defatted whole eggs, from which beneficial physical properties and functions possessed by raw whole eggs have been lost because of too severe thermal denaturation, or excessively defatted whole eggs which can hardly be used as food because of the harmful residual solvent.

On the above mentioned background, the inventors of the present invention conducted various studies about methods for treating raw whole eggs from which all neutral fats and cholesterol can be extracted without incurring heat denaturation, i.e. without heating raw whole eggs, but while retaining a part of phospholipids in order that protein denaturation does not occur, and solvent does not remain. As the result of these studies the instant process has been invented.

DESCRIPTION OF THE PREFERRED EMBODIMENT OF THE INVENTION

In the present invention, raw whole eggs are first homogenized and freed of moisture without heating. The most preferred way of doing this is to dehydrate by freeze-drying. With regard to this dehydration, approximately the same effect can be obtained by a spray drying method in which a low temperature treatment is carried out for a short time. By this procedure, moisture is removed from raw whole eggs almost without incurring denaturation. Also freeze drying of yolk alone is commercially advantageous.

Next, dried whole eggs are contacted with liquid dimethyl ether under anhydrous condition at room temperature or lower to extract and remove 95 percent or more of cholesterol and neutral fats in the dried whole eggs, and at the same time 30 to 70 percent of phospholipids in raw eggs. Then, by virtue of the volatility of dimethyl ether, the solvent is easily removed by a treatment under a reduced pressure at a low temperature to an extent of 0.1 ppm or lower to give cholesterol-free defatted whole eggs.

Dimethyl ether used as a solvent is a liquefied gas, being a non-polar volatile solvent having a boiling point of $-25°$ C. (760 mmHg). Its oil and fat extraction is not reduced even in the presence of water, and the solvent itself can dissolve several percent of water.

When oil and fat extraction of dried whole eggs is conducted with dimethyl either, 95% or more of neutral fats and cholesterol may be extracted, and 30 to 70% of phospholipids in the raw materials is extracted. After the extraction, there is contained in the residue of extraction, i.e., defatted whole eggs, 30 to 70% phospholipids which cannot be extracted with dimethyl ether, even by further extraction. The percentage of this phospholipid extraction residue ranges between 30% and 70% according to the results of experiments, but the reason for this spread is not known at present although the functions of defatted proteins are not changed by this spread.

At any rate, the solubility and various functions of proteins can be maintained almost unchanged from and not inferior to those of raw whole eggs, as the result of this partial defatting with dimethyl ether, when the defatted whole eggs are rehydrated and used as eggs because they contain a phospholipid fraction, and the extent of protein denaturation is small.

In the present invention, it is considered that the phospholipids remain in combined form.

In addition to what is described above, advantages obtained by the treatment of dried whole eggs with dimethyl ether are first (1) that heat is not applied to a material to be extracted since the extraction itself can be carried out at a low temperature; and secondly as the most advantageous and important point of the present process, (2) that dimethyl ether remaining in the residue can be easily and thoroughly removed because it is a very volatile solvent unlike conventional solvents. In case of dimethyl ether there is an advantage that its content can be reduced down to the order of 100 ppb or lower under mild conditions not usable with conventional solvents. This will be demonstrated in Experimental Example 1 which follows below herein.

In the experimental example 1, comparison of cholesterol-free defatted whole eggs made by using dimethyl ether according to the present invention and defatted eggs made by using hexane, as well as the variation in solvent removal based on time, are shown.

As there shown, dimethyl ether is promptly driven off down to zero residual content under mild conditions (40° C., reduced pressure) by treatment for so short a time as two hours, whereas as much as 1500 ppm, i.e. 0.15%, of hexane (b.p. 68° C.) remains after two hours, and 820 ppm after as long a treatment as ten hours (under the same conditions), and it is difficult to remove more hexane to lower its content by further treatment.

Furthermore, according to Table 1-1 of Experimental Example 1 the efficiency of cholesterol removal is poor with hexane alone, and also protein denaturation due to a solvent is more likely to occur with hexane.

From advantages (1) and (2) described above irreversible thermal denaturation of proteins does not occur since heat is not applied throughout the whole dimethyl ether treatment.

In addition, as shown in experimental Example 1, a third advantage is that cholesterol and neutral fats can be very efficiently removed while retaining phospholipids.

Dehydration and drying of eggs is first carried out in order to prevent phospholipids from being excessively extracted, as well as to prevent denaturation, degradation, or reduction of solubility of the proteins.

As shown in Experimental Example 2 hereinbelow, extent of moisture removal is usually selected so as to give 25% or lower, preferably 15% or lower and most preferably 5%, of water in dry eggs for the attainment of the above effects.

However, if heating is carried out for drying and the protein is denatured by heat, this will be undesirable. Thus dehydration at the lowest possible temperature is most important, so freeze-drying is most desirable and low temperature spray-drying is next most desirable.

In Experimental Example 3, samples were prepared by extracting with dimethyl ether eggs containing water (moisture 75%) and eggs containing no water (moisture 5%). The drying methods of the latter were as follows; (A) freeze drying of whole eggs, (B) spray drying of whole eggs, (C) freeze drying of yolk, and (D)

freeze drying of yolk to which a part of egg white was added, all of which were subjected to dimethyl ether extraction. (E) represents products in the market (imported from U.S.A.), as they were, and (F) yolks as they were, directly extracted with dimethyl ether and then freeze-dried. At the same time (G) was prepared by subjecting yolks to spray-drying and then extraction with hexane in order to compare again with a conventional solvent. To those other than whole eggs, among the above mentioned samples, at the end there was added spray-dried eggs white in order to make their protein content equivalent to those of whole eggs. These samples did not exhibit any inferiority in functional physical properties such as emulsifying capacity, compared with raw whole egg in the absence of water, but there was observed a marked reduction of the properties in the presence of water. This result, though it is only one example, explains a characteristic of the present invention, i.e. the functions of proteins are maintained. With regard to NSI (solubility of proteins), samples A, C and D, which have been subjected to extraction in the absence of water, showed very high values. Sample B followed thereafter and showed good results. Sample F, which was in the state containing water, was found to have been greatly denatured. The products in the market E fell in the middle between B and F. Similar results were obtained with regard to water holding capacity, which is one of the properties of proteins. Higher values of emulsifying capacity, water holding capacity and NSI were obtained for hexane-extracted product (G) as compared with the products in the market E, but they showed results considerably poorer than those of A, B, C and D.

With regard to the above six dried whole eggs A, B, C, E, F and G, cooking tests involving fried eggs and sensory tests were carried out. Their results are indicated in Experimental Example 4. The samples were evaluated with respect to flavor and texture of fried eggs. According to an over-all evaluation, those which were freeze-dried were best with regard to flavor and texture. Those which were spray-dried gave good flavor results. Conversely, the products in the market and whole eggs which were subjected to extraction with dimethyl ether in the presence of water gave poor results, very remote from real eggs. Additionally, sample G, for which hexane was used, was not liked due to an unpleasant odor.

EXPERIMENTAL EXAMPLE 1

One hundred fifty grams of freeze-dried whole eggs (moisture 4.3%, neutral fat 22.2%, phospholipid 10.3%, cholesterol 18.2 mg/g), passed through a 24 mesh screen, was charged into a pressure-resistant column (45 mm in diameter and 300 mm long) in the same manner as in Example 2 below. Two columns were prepared similarly and extraction was conducted for 40 minutes with 900 g of dimethyl ether in one column and 900 g of n-hexane in the other. Defatted whole eggs in both the columns were freed of entrained solvent by means of N₂ pressure, and solvent removal was conducted at 40° C. (10 mmHg) for 1 to 10 hours. The amounts of residual solvents after 1, 2, 3, 4 and 10 hours were examined by taking aliquot samples. The results are shown in Table 1. The residual solvent content was determined by gas liquid chromatography.

TABLE 1-1

Results of defatted whole egg production using liquid dimethylether and using hexane

| | liquid dimethylether | n-hexane |
|---|---|---|
| yield | 93.5 g | 94.0 g |
| neutral fat content | 0.7% | 1.2% |
| (extraction %) | (98.0%) | (96.6%) |
| phospholipid content | 8.9% | 11.0% |
| (extraction %) | (53.9%) | (33.1%) |
| cholesterol content | 0.8 mg/g | 12.3 mg/g |
| (extraction %) | (97.3%) | (57.6%) |
| nitrogen solubility index (N.S.I., %) | 88.0 | 78.0 |

TABLE 1-2

Change in the amount of residual solvent in defatted whole eggs with lapse of time of solvent removal treatment

| | amount of residual solvent (ppm) treatment time (Hrs.) | | | | | |
|---|---|---|---|---|---|---|
| | 0 | 1 | 2 | 3 | 4 | 10 |
| liquid dimethyl ether | 7.0% | 25 | N.D.* | N.D. | N.D. | N.D. |
| hexane | 8.2% | 7200 | 1500 | 980 | 890 | 820 |

*N.D. = Not Detected (Detection limit 0.1 ppm)

EXPERIMENTAL EXAMPLE 2

To each 100 g of freeze-dried whole eggs (same as those used in Experimental Example 1, moisture content 4.3%, passed through a 24 mesh screen), was added an appropriate amount of water uniformly to prepare whole eggs containing moisture in the proportion of 15%, 25%, 35%, and 50%, respectively. These whole eggs, and 100 g of whole eggs to which water had not been added, were separately charged into five pressure-resistant autoclaves. After introducing 250 g of liquid dimethyl either into these autoclaves, extraction was continued with stirring for 15 minutes at room temperature.

After extraction was complete, liquid dimethyl ether solution was transferred to another pressure-resistant container. Then this solution was heated slightly, evaporated, condensed and received in another pressure-resistant container. Thereafter 150 g of liquid dimethyl ether was added to the autoclave and a similar extraction was carried out. In the 3rd to the 6th extractions, 100 g of liquid dimethyl ether was used. After extraction was completed six times, the residue was taken from the autoclave and treated for 2 hours to carry out solvent removal at 40° C. and 10 mmHg. Thus four kinds of defatted whole eggs were obtained.

Additionally, by a procedure similar to the above, 100 g of raw liquid egg (moisture 75.0%) was treated, and defatted whole eggs were obtained.

With regard to the above six kinds of defatted whole eggs, yields of defatted eggs, extraction percentages of neutral fat, phospholipid and cholesterol and N.S.I. (nitrogen solubility index) were measured. The results are shown in Table 2.

TABLE 2

Extraction percentage of oils, fats, cholesterol, and N.S.I. in dependence on moisture content of dried whole eggs.

| moisture in dried whole egg | yield of defatted whole egg (dry) | extraction percent of each component | | | N.S.I. (%) |
| --- | --- | --- | --- | --- | --- |
| | | neutral fat | phospho-lipids | cholesterol | |
| 4.3% | 65.4g | 97.3% | 47.2% | 95.8% | 86.9 |
| 15% | 60.6g | 97.2% | 56.8% | 96.3% | 87.1 |
| 25% | 66.7g | 97.0% | 69.7% | 96.7% | 80.5 |
| 35% | 57.2g | 96.6% | 74.3% | 98.1% | 43.2 |
| 50% | 56.9g | 97.0% | 83.1% | 98.7% | 8.4 |
| 75% (raw egg) | 16.4g | 96.0% | 97.0% | 99.0% | 6.9 |

Additionally, N.S.I. in the table was determined by the following method:

2 g of defatted whole eggs were charged into a 100 ml measuring flask. After adding water to 100 ml, stirring was continued for three hours with a stirrer. After three hours, a solution and a precipitate were separated by a centrifugal separator at 3500 rpm for fifteen minutes and a supernatant was obtained. The total nitrogen of this supernatant and of the defatted whole eggs was measured by Kjeldahl's method and N.S.I. was calculated according to the following equation:

$$N.S.I. = \frac{\text{Total Nitrogen of supernatant}}{\text{Total Nitrogen of defatted whole eggs}} \times 100(\%)$$

EXPERIMENTAL EXAMPLE 3

Emulsifying capacity, N.S.I. (nitrogen solubility index), and water holding capacity were measured with regard to the following samples:

A: defatted whole eggs produced by freeze-drying whole eggs followed by extraction with dimethyl ether (hereinafter abbreviated as "extraction").

B: defatted whole egg produced by spray-drying whole eggs followed by extraction.

C: defatted yolk produced by freeze-drying yolk followed by extraction.

D: defatted eggs produced by freeze-drying yolk and adding a part of egg white thereto, followed by freeze-drying and extraction.

E: commercial decholesterolized defatted whole eggs (egg protein concentrate produced by Viobin Co., U.S.A.).

F: defatted yolk produced by the extraction of yolk with liquid dimethyl ether followed by removal of moisture by freeze-drying.

G: defatted yolk produced by spray-drying yolk followed by extraction with hexane.

At the time of measurement of physical properties, dried egg whites were added to C, D, F and G described above to render their protein composition identical to that of whole egg.

The amounts of cholesterol, neutral fats and phospholipids of A to G are given in Table 3.

TABLE 3

| | Compositions of sample A to G | | |
| --- | --- | --- | --- |
| | cholesterol | neutral fat | phospholipids |
| A | 0.8 mg/g | 0.9% | 10.3% |
| B | 1.0 mg/g | 0.9% | 10.9% |
| C | 1.2 mg/g | 1.2% | 10.5% |
| D | 1.1 mg/g | 0.9% | 10.8% |
| E | 1.0 mg/g | 1.0% | 2.0% |
| F | 0.5 mg/g | 1.3% | 3.0% |

TABLE 3-continued

| | Compositions of sample A to G | | |
| --- | --- | --- | --- |
| | cholesterol | neutral fat | phospholipids |
| G | 10.5 mg/g | 1.0% | 11.1% |

Measurement

Emulsifying capacity: Defatted whole egg (0.243 g as proteins) was added to 100 ml of 1 M NaCl solution and dissolved by stirring for two hours. Twenty ml of this solution was placed into a 500 ml container and cotton seed oil was added dropwise at a rate of 15 ml/min., and they were mixed and emulsified with a disperse mixer rotating at a rate of 20000 r.p.m. The phase transition point from O/W emulsion to W/O emulsion was confirmed by measuring reduction in viscosity and change in electric resistance. Emulsifying capacity was determined by converting the amount of oil required to reach a phase transition point per unit weight of protein (Swift method).

N.S.I.: N.S.I. was determined according to the method of Experimental Example 2, except that 1 M NaCl solution was used in place of water.

Water holding capacity: Five grams of defatted whole eggs was rehydrated, its protein content was adjusted to 12.7%, which was equal to that of whole eggs, and then gel was formed by heating at 80° C. for 30 minutes. The gel was then subjected to centrifugal separation at 6000 rpm for 15 minutes, and the amount of water separated was measured. Using this value, the water holding capacity per gram of protein was calculated.

Results: Results of measurements are given in Table 4 below.

TABLE 4

| | emulsifying capacity ml Oil/mg Protein | nitrogen solubility index (N.S.I. %) | water holding capacity ml $H_2O$/g Protein |
| --- | --- | --- | --- |
| A | 1.375 | 91.7 | 9.5 |
| B | 1.320 | 77.9 | 8.2 |
| C | 1.420 | 82.6 | 7.3 |
| D | 1.375 | 88.6 | 10.0 |
| E | 0.885 | 69.0 | 6.2 |
| F | 0.780 | 55.0 | 5.5 |
| G | 1.027 | 76.0 | 7.1 |
| raw egg | 1.405 | 98.4 | 10.4 |

EXPERIMENTAL EXAMPLE 4

Fried eggs were prepared from each of samples A, B, C, E, F and G shown in Experimental Example 3 and subjected to sensory tests.

Preparation of fried eggs

Distilled water (90.8 ml) was added to each sample (20 g) and stirred thoroughly for 15 minutes. These egg liquids were fried in a pan for about two minutes and circular fried eggs were made.

Sensory test

Six fried eggs were arranged arbitrarily and presented to a taste panel. They were asked their impressions and to choose which sample was most tasteful. The panel consisted of twelve persons and the tests were conducted according to Open Panel Method [reference: "Kannoukensa Handobukku" (Handbook of sensory test) by Nikkagiren Kannoukensa Iinkai (Sensory Test Committee in Japan Science and Technology Association), published by Bunshodo Co., 1973, page 577].

Results are shown in Table 5 below.

TABLE 5

| | | \multicolumn{6}{c|}{Results of sensory test of fried eggs} |
|---|---|---|---|---|---|---|---|
| | | \multicolumn{6}{c|}{sample} |
| | | A | B | C | E | F | G |
| Results of evaluation of fried eggs | flavour | fried egg flavour | fried egg flavour | slightly different odor with fried egg flavour not good | different odor bean odor | different odor | different odor |
| | taste | good | passable | and not bad | poor | watery | somewhat poor |
| | texture | excellent egg like | good, egg like | average, egg like | brittle, dehydrated feeling | chicken like, dehydrated feeling | average, somewhat brittle |
| | shape | natural | natural | natural | lumpy | slightly lumpy | natural |
| | color | yellowish | yellowish | whitish | whitish | whitish | whitish |
| number of times selected as most preferred | flavour | 7 | 4 | 1 | 0 | 0 | 0 |
| | texture | 8 | 2 | 1 | 0 | 0 | 1 |

As shown in Table 5, A and B were excellent, with a flavor and texture close to raw egg. Sample C also gave good results. On the contrary, samples E and F were fairly poor in terms of flavor and texture. Sample G was poor in flavor, probably attributable to the solvent.

By the above evaluation, the flavor and texture of the fried egg varied directly with the extent of protein denaturation, and thus freeze-drying is best for the present invention.

The merits of dimethyl ether extraction according to the present invention, which extracts cholesterol and lipids without causing protein denaturation, are summarized as follows:

(1) Egg proteins can be treated without any denaturation because all operations can be carried out at low temperatures. The defatted products so produced retain the characteristics of raw whole eggs.

(2) Since extraction is conducted using dimethyl ether, a part of the phospholipids remains in the defatted whole eggs, and hence the defatted whole eggs have the same physical properties as raw whole eggs.

(3) Cholesterol and neutral fats can be removed promptly and completely.

(4) There is substantially no residual solvent, i.e. residual solvent is on the order of 100 ppb or lower. Thus safety is ensured.

In actual operations, in case of a whole egg from which a shell is removed, after egg white and yolk are mixed well, preliminary freezing is carried out at $-20°$ C. or lower. Then freeze-drying is carried out so that the moisture content of the dried whole egg is 25% or lower, preferably 15% or lower, and most preferably 5% or lower. At this time neutral fats are from 20 to 25%, phospholipid is from 10 to 18% and cholesterol is from 17 to 25 mg/g of the dried whole egg. After being milled to a size of 24 mesh or less, this dry flake is charged into a pressure-resistant container and extracted with anhydrous dimethyl ether. If batchwise, extraction is carried out 6 times each with 1½ times as much solvent as egg and with stirring for 10 to 30, preferably 15, minutes followed by separation. In case of continous extraction, the amount of solvent overall is 6 times that of the dried egg and extraction is completed in 60 to 80 minutes. The extraction temperature is $-30°$ C. $-40°$ C. and the pressure from 0 to 8.5 Kg/cm$^2$ gage.

By the above-mentioned extraction, 30 to 70% of the phospholipids and 95% or more of the cholesterol and neutral fats can be extracted. Even by further treatment with dimethyl ether, this defatted whole egg does not change in quality and the phospholipids remaining in the defatted whole egg are not extracted. The dimethyl ether extract thereby obtained is separated from the extraction residue by filtration, and dimethyl ether is evaporated, by applying a small quantity of heat corresponding to its latent heat, condensed, and recovered. On the other hand, the extracted lipids are obtained as a by-product in a totally unoxidized state.

The residual defatted whole egg produced by the extraction is treated at 40° C. and 10 mmHg for two to three hours or under milder conditions after the entrained solvent has been thoroughly recovered in another container utilizing a temperature difference in a pressure-resistant container. By this operation the content of the residual solvent in the whole eggs may be reduced to 0.1 ppm or less. Although the defatted whole eggs obtained may be sufficient as they are, they may be reduced to powder of 60 to 100 mesh. The composition of the powder will be as follows: Water in the neighborhood of 5.0%; neutral fats 0.5 to 20%; phospholipids 7 to 14%; cholesterol 1.2 mg/g or less.

For rehydrating this defatted whole egg and adjusting the protein content to 12.7% of the raw whole eggs, water is added in an amount of about 4.5 to 5 times. In this case the composition of the resultant solution of defatted whole egg will be 75.0% of water, 0.08 to 0.36% of neutral fats, 1.2 to 2.5% phospholipids, 0.2 mg/g or less of cholesterol, and thus it is possible to reproduce raw whole egg, nearly free of cholesterol but not denatured, low in calories, and with no residual solvent.

Further, by adding vegetable oils or the like to this defatted whole egg to turn it again into a high calorie food, it is also possible to produce foods in which cholesterol alone is not present, since the emulsifying capacity is high in this case.

Examples of the present invention are given below. The present invention, however, should not be construed as being limited by these examples.

Additionally, cholesterol, neutral fats and phospholipids in the present invention are measured according to the following methods:

(1) Cholesterol (Total cholesterol)

To 5 g of egg powder, 25 ml of 95% ethanol and 3 ml of 50% KOH were added and saponification was conducted under reflux for 30 minutes. After cooling, the saponification products were extracted five times with 10 to 250 ml of petroleum ether to obtain a solution of unsaponified material. 100 ml of the solution was placed in a measuring flask. Depending upon the amount of cholesterol in the sample, 0.5 to 10 ml aliquots of petroleum ether solution were separated. After removing petroleum ether, 2 ml of chloroform and 5 ml of acetic anhydride-concentrated sulfuric acid mixture [4:1 (volume/volume)] were added and shaken well. Optical densities at 610 m$\mu$ were measured after 15 minutes and the quantity of cholesterol was determined by a calibration curve previously prepared.

(2) Neutral fats and phospholipids

Egg powder (10.0 g) was charged in a beaker and 70 to 100 ml of a mixed solution of chloroform-methanol [2:1 (volume/volume)] was added and extraction was conducted with stirring for 30 minutes. After repeating the extraction three times, extracts were combined and dehydrated with anhydrous sodium sulfate and then the solvent was removed in vacuo. The residue, after complete removal of chloroform, was designated as crude fat. To this crude fat, cold acetone (in about 5 to 10 times by volume) was added and extraction was carried out with stirring. After repeating this procedure three times, the acetone soluble matter and insoluble matter were designated as neutral fats and phospholipids, respectively, and their weights were measured.

EXAMPLE 1

After breaking open chicken eggs, yolk and egg white were mixed well to form liquid whole egg. The liquid whole egg (2.0 Kg) (moisture 75.0%, neutral fat 6.5%, phospholipid 4.8%, cholesterol 5.1 mg/g) was poured into an aluminum tray up to 7 mm high, and subjected to preliminary freezing at −20° C. overnight. After the freezing, the liquid whole egg was freeze-dried in a freeze-dryer for 30 hours, and 540 g of dry whole egg (moisture 7.4%, neutral fats 24.1%, phospholipids 17.6%, cholesterol 18.7 mg/g) was obtained.

This frozen whole egg was crushed in a mixer and 150 g of powder of 24 mesh was charged into a 1 liter glass autoclave. Then 375 g of dimethyl ether was poured into the autoclave and extraction was carried out with stirring for 15 minutes at 25° C. After 15 minutes, extracted liquid was passed from the autoclave through a cotton filter to another autoclave. From this extracted liquid, dimethyl ether was recovered by heating slightly, evaporating and cooling. Of the recovered amount, 225 g of dimethyl ether was again introduced into a 1 liter autoclave and a second extraction was repeated in the same manner. Separation of extracted liquid and recovery of dimethyl ether were carried out in the same manner, and four more extractions were subsequently carried out each using 150 g of dimethyl ether. After the 6th extraction was completed, the extracted liquid was likewise removed by filtration. Thereafter, dimethyl ether containing entrained defatted whole egg in the autoclave was removed and recovered in another autoclave by a conventional method which utilizes the temperature difference.

Any trace of dimethyl ether remaining in the defatted whole egg taken out from the autoclave was removed and recovered completely by a treatment at a temperature of 40° C. and a pressure of 10 mmHg for two hours. Thus, 91.0 g of white, cholesterol-free defatted whole egg having a slight pink tone was obtained.

Analytical values are given below: moisture 6.9%, neutral fats 1.8%, phospholipids 11.6%, cholesterol 1.0 mg/g, dimethyl ether not detected (0.1 ppm or less).

EXAMPLE 2

In the same manner as in Example 1, 150 g of frozen dry whole egg (moisture 4.8%, neutral fat 23.8%, phospholipids 11.8%, cholesterol 18.2 mg/g) was crushed in a mixer to a powder of 24 mesh or smaller. The whole egg powder was charged into a pressure-resistant column (45 mm in diameters and 300 mm long), and after dimethyl ether filled the column at a room temperature, it was passed through the column from the bottom to the top at a flow rate of 33 ml/min (22.4 g/min). After about 54 minutes, 1200 g of dimethyl ether had been passed through. Entrained liquid retained in the column was forced out by $N_2$ pressure from the top to the bottom of the column, and then the solvent remaining in the defatted whole egg was removed and recovered by a conventional method which utilizes temperature difference. After removing the defatted whole egg from the column, the solvent was completely removed by the treatment at a temperature of 40° C. and a pressure of 10 mmHg for three hours (yield: 92.0 g). Analytical data obtained were as follows: moisture 4.2%, neutral fats 0.8%, phospholipids 9.3%, cholesterol 0.7 mg/m and dimethyl ether not detected (0.1 ppm or less).

EXAMPLE 3

Frozen dry whole egg (1.0 Kg) (moisture 6.1%, neutral fats 21.6%, phospholipids 13.7%, cholesterol 18.2 mg/g) was crushed with a mixer to fine particles, all 24 mesh or smaller. Then the dry whole egg was charged into a large column (81 mm in diameter and 500 mm long) and extraction was carried out with dimethyl ether at room temperature according to the method of Example 2. Flow rate: 107 ml/min (73 g/min), dimethyl ether 4.0 Kg.

After about 55 minutes, methoxymethane retained in the column was separated by a filter installed on the bottom of the column, and most of dimethyl ether was removed and recovered utilizing temperature difference by connecting the column with another pressure container. The defatted whole egg was taken out from the column and solvent was removed in the same manner as in Examples 1 and 2. Cholesterol free defatted whole egg 635.2 g (moisture 5.7%, neutral fat 1.2%, phospholipids 10.1%, cholesterol 0.9 mg/g, dimethyl ether not detected (0.1 ppm or less)) was obtained.

EXAMPLE 4

Whole egg (150 g) dried by a centrifugal type spray-dryer (moisture 10.0%, neutral fats 23.3%, phospholipids 17.0%, cholesterol 18.9 mg/g) was charged into a 300 ml column (45 mm in diameter and 300 mm long) and the column was filled with dimethyl ether at room temperature. After it was filled, 900 g of dimethyl ether was passed through the column from the bottom to the top at a flow rate of 33 ml/min. Extraction was finished after 40 minutes and dimethyl ether retained in the column was recovered from the bottom by pressurizng with $N_2$ gas. After recovering dimethyl ether and conducting solvent removal by a conventional method which utilizes temperature difference, 90.5 g of defatted whole egg (moisture 8.9%, neutral fats 1.6%, phospholipids 13.7%, cholesterol 0.9 mg/g, dimethyl ether not detected (0.1 ppm or less)) was obtained.

EXAMPLE 5

Frozen dry yolk (97.3 g) (moisture 2.2%, neutral fats 36.2%, phospholipids 26.4%, cholesterol 50.4 mg/g) was crushed with a mixer to fine powder 24 mesh or smaller. The powder was charged into a large column (81 mm in diameter, 500 mm long) and extraction with dimethyl ether was carried out at 30° C. A flow rate of 107 ml (73 g/min) was employed and 5614 g of extract was obtained. After recovering dimethyl ether in the column from the bottom by pressurizing with $N_2$, yolk was taken out from the column and dimethyl ether was completely removed by a conventional method [yield 446.5 g (moisture 3.0%, neutral fats 2.6%, phospholipids 24.7%, cholesterol 1.6 mg/g, dimethyl ether not detected (0.1 ppm or less)].

What is claimed is:

1. Decholestrolized and defatted egg powder comprising less than 5% of the cholesterol originally contained in a whole egg or yolk and less than 5% of the neutral fat originally contained in a whole egg or yolk, no foreign solvent, and at least 30% of phospholipids based upon the total amount thereof originally contained in the whole egg or yolk.

2. A method for producing decholesterolized and defatted egg powder which comprises removing moisture from whole egg or yolk to obtain a moisture content of up to 25% by weight contacting the resulting whole egg or yolk with liquid dimethyl ether to remove 95% or more of the cholesterol and 95% or more of the neutral fat therefrom and to retain 30% or more of the phospholipids, and removing the dimethyl ether.

3. A method for producing decholesterolized and defatted egg powder according to claim 2 wherein removal of moisture is carried out by freeze-drying or spray drying.

4. A method for producing decholesterolized and defatted egg powder according to claim 2 wherein contact of the dried whole egg or yolk with liquid dimethylether is carried out in a weight ratio of dried whole egg or yolk to liquid dimethylether of 1:6 and at a temperature of −30° C. to about +40° C.

* * * * *